United States Patent
Kammann (10) Patent No.: US 8,291,754 B2
(45) Date of Patent: Oct. 23, 2012

(54) TIRE MODULE HAVING A PIEZO-SENSITIVE SENSOR

(75) Inventor: Stefan Kammann, Kelkheim (DE)

(73) Assignee: Continental Teves AG & Co. oHG (DE)

( * ) Notice: Subject to any disclaimer, the term of this patent is extended or adjusted under 35 U.S.C. 154(b) by 0 days.

(21) Appl. No.: 12/674,334

(22) PCT Filed: Aug. 27, 2008

(86) PCT No.: PCT/EP2008/061200
§ 371 (c)(1),
(2), (4) Date: Jan. 14, 2011

(87) PCT Pub. No.: WO2009/027423
PCT Pub. Date: Mar. 5, 2009

(65) Prior Publication Data
US 2011/0113876 A1    May 19, 2011

(30) Foreign Application Priority Data

| Aug. 31, 2007 | (DE) | 10 2007 041 499 |
| Aug. 31, 2007 | (DE) | 10 2007 041 509 |
| Jul. 30, 2008 | (DE) | 10 2008 035 486 |
| Jul. 30, 2008 | (DE) | 10 2008 035 498 |

(51) Int. Cl.
*B60C 23/02* (2006.01)
(52) U.S. Cl. ...................................... 73/146.5
(58) Field of Classification Search .......... 73/146–146.8
See application file for complete search history.

(56) References Cited

U.S. PATENT DOCUMENTS

| 5,741,966 A * | 4/1998 | Handfield et al. ........... 73/146.5 |
| 5,749,984 A | 5/1998 | Frey et al. |
| 7,212,104 B2 | 5/2007 | Haswell et al. |
| 7,456,732 B2 * | 11/2008 | Tranchina ..................... 340/447 |
| 2006/0260390 A1 | 11/2006 | Oflaz |
| 2009/0211352 A1* | 8/2009 | Hatanaka et al. ................ 73/146 |

FOREIGN PATENT DOCUMENTS

| DE | 4402136 A1 | 7/1995 |
| DE | 102004031810 A1 | 1/2006 |
| DE | 102006004707 A1 | 9/2006 |
| DE | 102005021494 A1 | 11/2006 |
| DE | 102006033951 A1 | 10/2007 |
| DE | 60311669 T2 | 11/2007 |
| DE | 102007044723 A1 | 4/2008 |
| EP | 1813493 A1 | 11/2005 |
| EP | 1757464 A1 | 2/2007 |
| EP | 1816013 A1 | 8/2007 |

* cited by examiner

*Primary Examiner* — Andre Allen
(74) *Attorney, Agent, or Firm* — RatnerPrestia (57) ABSTRACT

A tire module for detecting tire condition variables, the module being mounted on an inside of a tire in an area deformed during tread shuffle and including at least one carrier, on which at least one electronic component is disposed, and at least one piezo-sensitive sensor, the piezo-sensitive sensor being disposed such that it is at least partially deformed during deformation of the tire during tread shuffle, and the deformation of the piezo-sensitive sensor being used to determine at least one shuffle variable, and the tire module including at least one battery for at least partially supplying energy to the at least one electronic component, and to use of the tire module.

22 Claims, 7 Drawing Sheets

TIRE MODULE HAVING A PIEZO-SENSITIVE SENSOR

CROSS REFERENCE TO RELATED APPLICATIONS

This application is the U.S. national phase application of PCT International Application No. PCT/EP2008/061200, filed Aug. 27, 2008, which claims priority to German Patent Application No. 10 2007 041 509.7, filed Aug. 31, 2007, German Patent Application No. 10 2007 041 499.6, filed Aug. 31, 2007, German Patent Application No. 10 2008 035 498.8, filed Jul. 30, 2008 and German Patent Application No. 10 2008 035 486.4, filed Jul. 30, 2008, which are each incorporated by reference herein.

FIELD OF THE INVENTION

The invention relates to a tire module and to the use thereof in a tire pressure monitoring system.

BACKGROUND OF THE INVENTION

In modern motor vehicles, devices are being increasingly used which perform early detection of defects and malfunctions in various areas in the motor vehicle and signal defects and malfunctions to the driver. This includes, for example, the sensing of the tire air pressure in order to avoid defects or accidents which are due to an excessively low tire air pressure. In many of the systems which are already used for this purpose, in each case a tire module is arranged at each wheel, in particular in the interior of the tire. The tire module usually comprises at least one sensor for sensing the tire air pressure, if appropriate an assigned electronic evaluation system and a transmitting unit for transmitting the tire air pressure to a central processor unit on the vehicle.

Tire modules which are arranged in the interior of the tire in the region of the tread should be as lightweight as possible since they are otherwise destroyed by the forces occurring the tire or generate an imbalance of the tire. For this reason, as few elements as necessary are integrated into such tire modules. It is therefore known for a piezo-electric element to be arranged in a tire module which is arranged in the interior of the tire, which piezo-electric element is used both to detect the rotation of the tire and to supply power to the tire module.

For example, DE 44 02 136 A1, which is incorporated by reference, discloses a system for determining the operational parameters of vehicle tires, in which system a carrier unit, which is fitted with a sensor unit with at least one detector and one electronic evaluation system, is arranged integrated into the vehicle tire. A piezo-electric element, which serves to supply power to the system components and at the same time serves as a sensor for the rotation of the tire, is arranged on the carrier body. The system is integrated into the rubber of the tire, with the result that electrical power is acquired by virtue of the piezo-electric effect due to the hydrostatic pressure stresses which vary cyclically in the rubber of the tire.

DE 10 2004 031 810 A1, which is incorporated by reference, describes a sensor transponder having a piezo-electric element which is arranged in a vehicle pneumatic tire, wherein the piezo-electric element is arranged on the inside of the tire opposite the tread. The signal of the piezo-electric element is used here to determine the wheel speed, and the piezo-electric element provides all the power for supplying the electronic components of the sensor transponder and for transmitting data.

SUMMARY OF THE INVENTION

Taking this prior art as a starting point, the invention relates to the object of making available an alternative tire module which has a piezo-electric element for attachment in the interior of a tire in the region of the tread, and which is not dependent on the power supplied by the piezo-electric element.

The invention relates to the idea of arranging in a tire module at least one battery for at least partially supplying power to the tire module which is mounted on an inner side of a tire in the region of the tread, and comprises at least one piezo-sensitive element which is also deformed when the tire is deformed during tread shuffle, wherein this deformation is evaluated in order to determine a shuffle characteristic variable, and a carrier means on which at least one electronic component is arranged.

The term "piezo-sensitive element" or "piezo-sensitive sensor" is to be understood according to aspects of the invention as meaning an element/sensor which is sensitive to pressure or deformation and has piezo-electric or piezo-resistive properties.

The term "shuffle characteristic variable" describes, according to aspects of the invention, a characteristic variable which is characteristic of the shuffle. This may be, for example, a characteristic variable which characterizes the size or the shape of the shuffle, for example the shuffle length or the shuffle time.

The piezo-sensitive element is preferably exclusively used as a sensor element for determining the shuffle characteristic variable. Correspondingly, one or more batteries are preferably the only power supply source of the tire module. If the piezo-sensitive sensor, in particular a piezo-electric sensor, is used exclusively as a sensor element and not for supplying power, the positioning of the tire module in the tire is less critical since it is not necessary to ensure that the installation position ensures suitable deformation of the element in order to continuously and sufficiently supply power to the tire module.

The carrier means is preferably a printed circuit board on which particularly preferably all the electronic components of the tire module are arranged and/or to which all the electronic components of the tire module are connected. It is therefore not necessary for a further printed circuit board to be arranged in the tire module.

According to one preferred embodiment of the invention, the piezo-sensitive sensor is a piezo-resistive sensor. The latter comprises a voltage supply or is connected to a voltage supply. The piezo-resistive sensor particularly preferably comprises a piezo-resistive measuring bridge with at least one piezo resistor. Such measuring bridges are known per se from the prior art. The shuffle characteristic variable is then determined from an output voltage signal of the piezo-resistive sensor. Piezo-resistive elements or sensors (measuring bridges) provide the advantage that they can be manufactured in a small and cost-effective form. It is quite particularly preferred for the piezo resistor or the piezo-resistive sensor (measuring bridge) to be formed directly on the printed circuit board as a micro-electro-mechanical system (MEMS). This makes the tire module smaller and reduces the manufacturing costs.

In the case of a piezo-resistive sensor, the battery of the tire module preferably also supplies the piezo-resistive sensor with electric power. There is therefore no need for a further battery.

According to one development of the invention, the piezo-resistive sensor comprises a piezo-resistive measuring bridge in the form of a Wheatstone bridge, wherein at least one resistor is embodied as a piezo-resistive element, the resistance of which changes during a tread shuffle due to deformation (measuring resistance). The Wheatstone bridge particularly preferably comprises four resistors in total, with at least one resistor being embodied as a piezo-resistive element.

The output signal of the piezo-resistive sensor is preferably amplified by an amplifier and digitized by means of an A/D converter. The digital signal can then simply be evaluated in a microcontroller or a computing unit in order, for example, to determine the shuffle characteristic variable.

Alternatively it is preferred to evaluate the output signal of the piezo-resistive sensor by means of a comparator with a downstream microcontroller or computing unit. The evaluation using a comparator does not require an A/D converter.

According to another preferred embodiment of the invention, the piezo-sensitive sensor is a piezo-electric sensor, wherein the shuffle characteristic variable is determined from an output voltage signal of the piezo-electric sensor. When the latch sensor is embodied as a piezo-electric sensor, it is advantageous, in contrast to the embodiment as a piezo-resistive sensor, that a voltage supply to the sensor is not necessary. As a result, corresponding contact-forming means are dispensed with and the current consumption of the tire module is minimized. With a piezo-electric sensor it is also easily possible to activate the tire module when the vehicle starts to move (referred to as "wakeup" function) since a piezo voltage is generated when a shuffle is entered or exited.

An output signal of the piezo-sensitive sensor is preferably used to detect when the tire module enters and/or exits a shuffle. As a result, in addition to the shuffle length and/or shuffle time it is then also possible to determine the wheel rotation time or rotational speed of the wheel. Furthermore, in order to spare the battery of the tire module, the tire module can be deactivated when the vehicle is stationary (for example no detection of pressure data or transmission of data) and the output signal of the piezo-sensitive shuffle sensor can then be used to activate the tire module when the vehicle starts to move after the stationary state (referred to as "wakeup" function).

An electronic evaluation circuit, in which a characteristic variable, which is a measure of the shuffle length and/or shuffle shape of the tire, is determined from the output signal of the piezo-sensitive sensor, is preferably arranged in the tire module. The information from one or more shuffle sensors on the vehicle can therefore allow conclusions about the load of the vehicle to be drawn or additional information to be acquired for tire monitoring purposes. To this end, the specific shuffle lengths of the individual tires are compared with one another or respectively with previously learnt comparison variables or with respectively predefined comparison variables.

In order to withstand the loads occurring in the tire, it is necessary, that, in particular a tire module which is mounted in the interior of the tire in the region of the tread is as compact as possible. For this reason, according to one preferred embodiment of the tire module, the carrier means and the battery are arranged one on top of the other with respect to a direction of extent of the tire module, wherein the carrier means and the battery are arranged perpendicularly with respect to the direction of extent, in at least partially overlapping fashion, and the piezo-sensitive sensor is arranged above or below or between the carrier means and the battery with respect to the direction of extent, wherein the piezo-sensitive sensor is respectively arranged perpendicularly with respect to the carrier means and with respect to the battery with respect to the direction of extent, in an at least partially overlapping fashion. The direction of extent is particularly preferably the height of the tire module. Expressed in simple terms, the three components comprising the carrier means, battery and piezo-sensitive sensor are arranged (stacked) one on top of the other and at least partially overlapping one another in the tire module in order to keep the extent of the tire module as small as possible with respect to its base area. The deformation forces acting on the tire module during tread shuffle are therefore kept as low as possible, as a result of which the piezo-sensitive sensor is protected against excessive deformation, which can lead to damage to the sensor, for example to fracturing of the piezo-electric material. Thus no additional deflection-limiting means, which would again increase the weight of the tire module, are necessary for the piezo-sensitive element.

In order to provide further protection of the piezo-sensitive sensor against damage, the carrier means, the battery and the piezo-sensitive sensor are preferably at least partially embedded in a sealing compound. The three components are particularly preferably completely embedded in the sealing compound in order to provide protection against environmental influences on all sides. The stiffening of the piezo-sensitive sensor, which is achieved by means of the sealing material, further minimizes the risk of fracturing. Owing to the compact design of the tire module ("stacking" of the components), less sealing compound is required for embedding the carrier means, battery and piezo-sensitive sensor than when they are arranged one next to the other, which provides an advantage with respect to making the tire module as low in weight as possible.

According to one advantageous development of the invention, the piezo-sensitive sensor is attached directly to the battery or to the carrier means. As a result, the piezo-sensitive sensor is also additionally protected by the battery or the carrier means against excessive deformation. The attachment is particularly easily and cost-effectively embodied as a bonded connection. In the case of a piezo-resistive sensor, said sensor is advantageously embodied directly using silicon as a micro-electro-mechanical system (MEMS). This reduces the manufacturing costs of the tire module.

It is likewise preferred to arrange the piezo-sensitive sensor at a distance from the carrier means and from the battery, wherein the piezo-sensitive sensor is connected in a frictionally locking fashion to the carrier means and/or to the battery by the sealing compound. In this way, in contrast to an arrangement of the piezo-sensitive sensor on the carrier means, installation space is provided for further electronic components on the carrier means.

The piezo-sensitive sensor is preferably arranged between the battery and the carrier means ("sandwich arrangement") in order to provide reinforcement and protection on both sides.

According to one preferred embodiment of the tire module, the carrier means, the battery and the piezo-sensitive sensor are each of substantially planar design, and the base surfaces of the carrier means, battery and piezo-sensitive sensor are arranged substantially parallel and one on top of the other, wherein the base surfaces each at least partially overlap in pairs. This provides a compact design in terms of height and base area, which makes the weight low in the case of embedding in a sealing compound.

According to one preferred embodiment of the invention, the piezo-electric sensor is composed simply of piezo-electric material, particularly preferably from piezo-electric ceramic (for example PZT: lead zirconate titanate). Since PZT does not react piezo-electrically to bending but rather only to extension and/or compression, the piezo-electric material is applied to a carrier material (contains "neutral phase"). The carrier material therefore serves, on the one hand, to protect the piezo-electric material against excessive deformation and, on the other hand as an "aid" for the extension/compression of the piezo-electric material. The carrier means of the tire module (printed circuit board) or the battery preferably serves as a carrier material.

Alternatively, the piezo-electric sensor preferably comprises a carrier element made of metal and piezo-electric material, wherein the piezo-electric material is applied to the carrier element. The carrier element therefore serves directly by virtue of its rigidity, as a deformation-limiting means for the piezo-electric material. The carrier element is particularly preferably a brass disc or a brass plate. The piezo-electric material is particularly preferably a piezo-electric ceramic. The piezo-electric sensor is particularly preferably attached directly to the battery or to the carrier means by its carrier element, quite particularly preferably by bonding.

According to one advantageous development of the invention, the tire module comprises two or more batteries which are arranged one on top of the other, wherein the piezo-sensitive sensor is arranged above or below or between the batteries. In the case of an arrangement of the piezo-sensitive sensor between the batteries, the latter is protected on both sides by the batteries against excessive deformation.

In order to supply the electronic components of the carrier layer, the battery is preferably connected in an electrically conductive fashion to the carrier layer via a battery contact, wherein the piezo-electric sensor is connected on one side in an electrically conductive fashion to the battery contact. This avoids the need to provide means for forming contact between the carrier layer and piezo-electric sensor.

According to one preferred embodiment of the tire module, the piezo-electric sensor is also used to supply power to the tire module. For this purpose, the tire module comprises, in particular on the carrier means, an electronic circuit which is embodied in such a way that the electrical voltage, which is generated when the piezo-electric sensor is deformed, is also used to supply power to the tire module. The electronic circuit therefore particularly preferably comprises means for rectifying the piezo voltage of the piezo-electric element and for storing the generated electric power. The additional supply of power to the tire module using the piezo-electric element lengths the service life of the battery.

In order to evaluate the voltage signal of the piezo-sensitive sensor, the latter is preferably connected in an electrically conductive fashion to the carrier means.

The tire module preferably comprises an evaluation circuit in which the positive and negative components of the voltage signal of the piezo-sensitive sensor are separated. This evaluation circuit of the tire module particularly preferably comprises four diodes.

Each of the two component signals which are produced is preferably evaluated. It is therefore possible, by evaluating the voltage signal of the piezo-sensitive sensor, to differentiate between the entering and exiting of a shuffle.

It is likewise preferred that in the evaluation circuit the one component signal is evaluated in order to detect the entering into a shuffle and the other component signal is evaluated in order to detect the exiting from a shuffle.

According to one development of the invention, in the evaluation circuit the two component signals are evaluated in order to determine a characteristic variable which is a measure of the shuffle length or shuffle shape of the tire. Information about the loading of the vehicle and/or the monitoring of the tire is acquired from this, also in combination with the characteristic variables of tire modules of the other tires.

The tire module preferably comprises a circuit with which one or both of the component signals is/are used to supply power to at least one electronic component. A sensor, for example a pressure sensor and/or a temperature sensor and/or an evaluation circuit is particularly preferably supplied with electric power.

One advantage of the invention is that the battery ensures that the tire module is supplied even when the vehicle is stationary. It is therefore possible for the tire module to carry out, for example, data transmissions or pressure measurements even when the vehicle is stationary.

The invention also relates to the use of the tire module in a tire-pressure-monitoring system.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
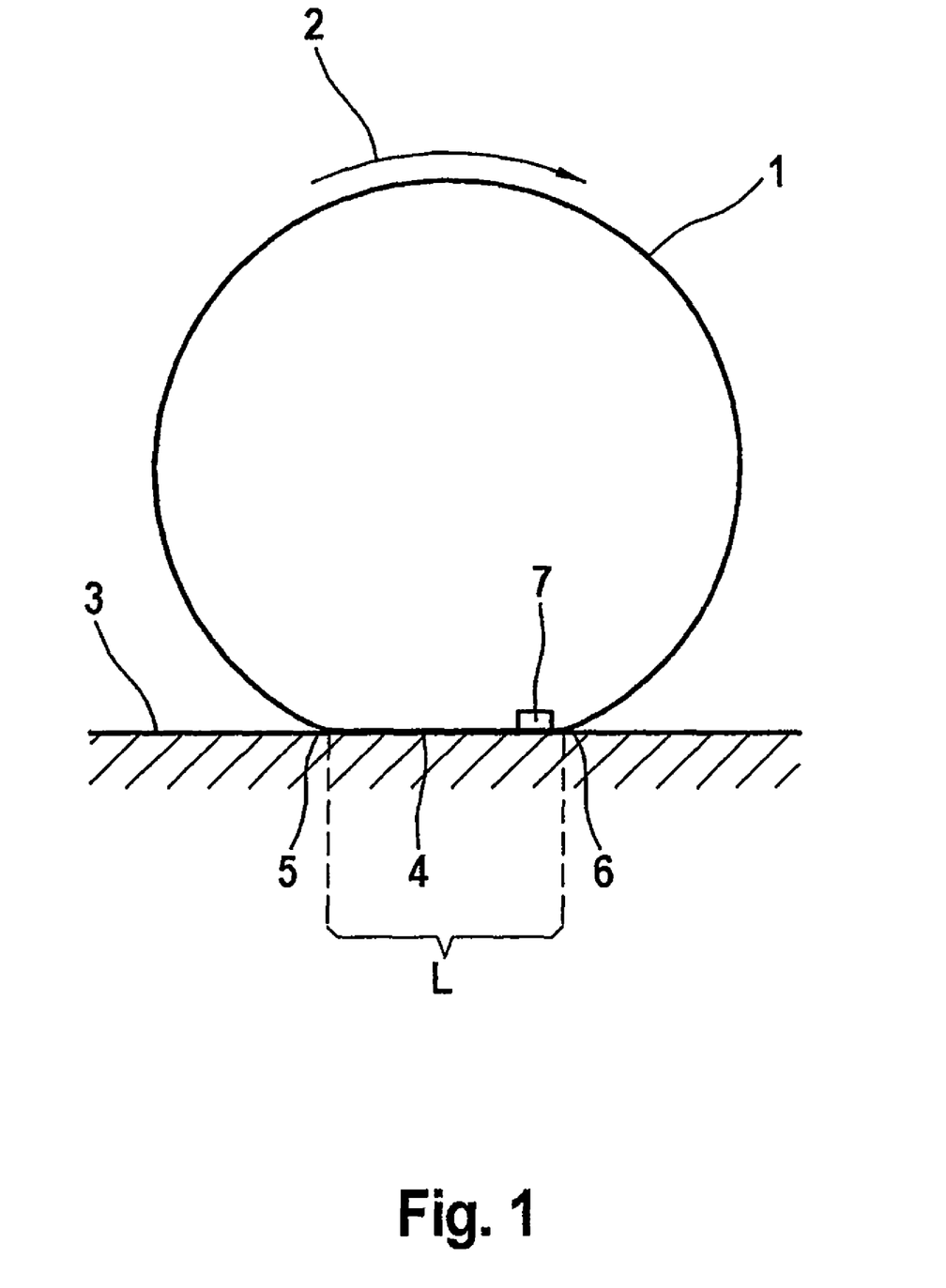
FIG. 1 shows a tire rolling on an underlying surface.

FIG. 1 shows the rolling behavior of a tire 1 with a rotational direction 2. The rolling behavior is illustrated here in an idealized form on a level underlying surface 3. A flattened contact surface, referred to as the shuffle 4, is produced. The size, that is to say the length L and the width, the length L being measured from the entry 6 into the shuffle up to the exit 5 from the shuffle, and the shape of the shuffle 4 are dependent, inter alia, on tire characteristic data, the wheel load, the tire pressure, the driving state (longitudinal forces and lateral forces) and on the speed.

If there is a tire module 7 in tire 1, forces act on said tire module 7 when a shuffle is entered 6 and when a shuffle is exited 5 owing to the deformation of the tire 1, said forces leading to deformation of at least parts of the tire module 7. The deformation of the tire 1 during tread shuffle, specifically the buckling when the shuffle is entered 6 and when the shuffle is exited 5 can be measured with a piezo-sensitive element. The tire module 7 is mounted in the tire in such a way that the piezo-sensitive element in the tire module 7 is deformed by the tumbling movements.

An exemplary tire module 7 comprises a battery 10 and a piezo-sensitive (measuring) element, for example a piezo-electric or a piezo-resistive (measuring) element. The battery 10 preferably serves here to supply the electronic components of the tire module 7. The piezo-sensitive (measuring) element serves to determine or measure a characteristic variable of the shuffle 4, in particular to determine or measure the shuffle length L or an associated variable such as, for example, the shuffle time. In addition, the piezo-electric element can also be used as converter element, i.e. for generating electric power.

Figure 2A:
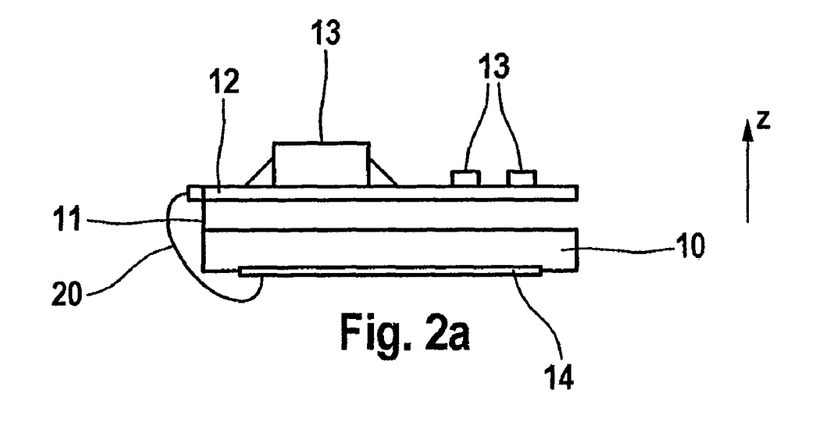
FIGS. 2a and 2b show an arrangement of components in a tire module according to aspects of the invention, in accordance with a first exemplary embodiment.
Figure 2B:
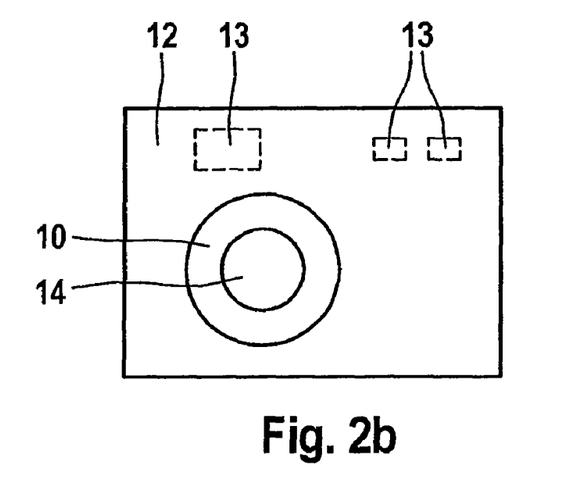

FIGS. 2a and 2b is a schematic illustration of number of relevant parts of a tire module 7 according to aspects of the invention in accordance with a first exemplary embodiment. FIG. 2a shows a side view, FIG. 2b shows a view from below in the upward direction (in the z direction, see FIG. 2a). Battery 10 is connected to printed circuit board 12 via an electrically conductive connection 11 (not illustrated in FIG. 2b). Battery 10 is arranged underneath the printed circuit board 12. The, for example, round base surface of battery 10 completely overlaps the, for example, rectangular base surface of the printed circuit board 12. According to the illustrated exemplary embodiment, the battery 10 and the printed circuit board 12 are arranged at a certain distance in the z direction, but it is also possible for the battery 10 to be attached directly to the printed circuit board 12. Further electronic components 13 are attached to the printed circuit board 12. For example, a piezo-electric sensor element 14 underneath the battery 10 is attached to the battery 10. The, for example, round base surface of the piezo sensor 14 completely overlaps the, for example, round base surface of the battery 10. The piezo element 14 is connected via an electrical connection 20 to the printed circuit board 12 (not illustrated in FIG. 2b).

Figure 3:
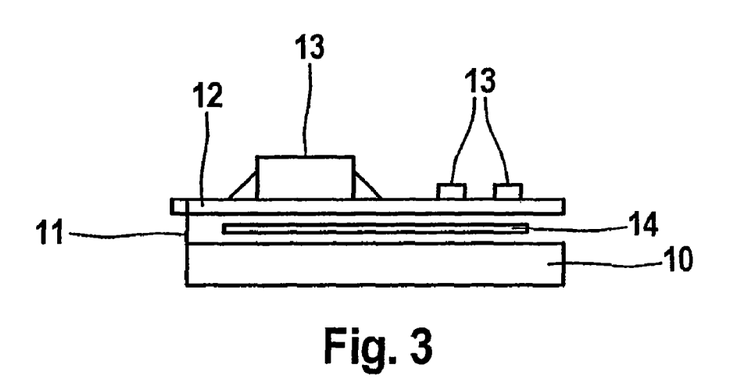
FIG. 3 shows an arrangement of components in a tire module according to aspects of the invention, in accordance with a second exemplary embodiment.

FIG. 3 is a schematic illustration of an arrangement of relevant components in a tire module 7 according to aspects of the invention in accordance with a second exemplary embodiment in a side view. The battery 10 is connected via an electrically conductive connection 11 to the printed circuit board 12. The battery 10 is arranged, as in the first exemplary embodiment, at a certain distance underneath the printed circuit board 12. In this context, the base surfaces of the battery 10 and printed circuit board 12 at least partially overlap (not shown in the view in FIG. 3). The piezo-electric element 14 is arranged between the battery 10 and the printed circuit board 12, wherein the base surface of the piezo element 14 overlaps, on the one hand, the base surface of the battery 10 and, on the other hand, the base surface of the printed circuit board 12. Further electronic components 13 are attached to the printed circuit board 12.

The electronic components 13 may be, for example, one or more of the following components: pressure sensor, temperature sensor, transmission device (for example RF transmitter), receiver device (for example RF receiver), electronic evaluation circuit, rectifier, memory element.

Figure 4:
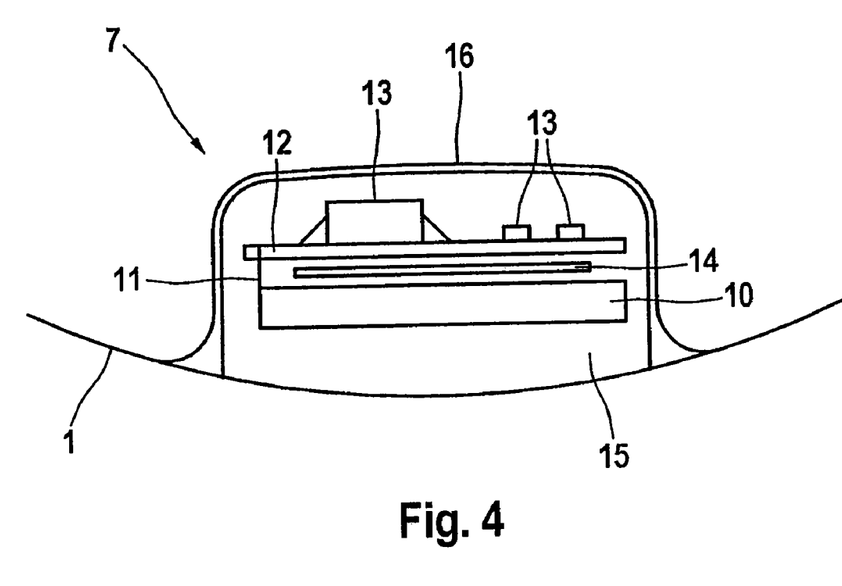
FIG. 4 shows a tire module according to aspects of the invention, in accordance with a third exemplary embodiment.

FIG. 4 is a schematic illustration of a third exemplary embodiment of a tire module 7 according to aspects of the invention. The arrangement of the battery 10, printed circuit board 12 and piezo-electric element 14 corresponds to the second exemplary embodiment illustrated in FIG. 3. In addition, the battery 10, printed circuit board 12, piezo-electric element 14 and electronic components 13 are surrounded by a suitable sealing compound 15. In the third illustrated exemplary embodiment, the components are completely surrounded by the sealing compound 15, but it is also possible for only some of the components to be surrounded by the sealing compound 15, or for the components to be only partially surrounded by the sealing compound 15. The components are protected against external influences by the sealing compound 15. Even if parts of the tire module 7 are encapsulated, the movements (deformations) of the tire 1 during tread shuffle are transmitted to the individual components, in particular to the piezo-electric element 14.

Instead of the piezo-electric sensor 14 which is present in the three exemplary embodiments described above (FIGS. 1 to 4) the tire module can also comprise a piezo-resistive sensor.

According to the third exemplary embodiment, the tire module 7 is mounted on the tire 1 by means of a container 16 which is composed, for example, of rubber. For this purpose, the container 16 is mounted on the inner liner of the tire 1, for example bonded or vulcanized in. The container 16 may, for example, contain an opening (not illustrated in FIG. 4) through which the tire module 7 can be removed from the container 16 or inserted into the container 16. It is therefore possible for replacement to be carried out when there is a defect in the tire module 7.

When extension/compression or bending occurs in the piezo element 14, for example when a shuffle is entered and exited, load separation occurs. If the piezo element 14 is used exclusively as a (shuffle deformation) sensor, and not as an energy converter, the precise arrangement in the tire module 7 is not of decisive significance for satisfactory functioning. This permits an installation-space-minimizing arrangement of the battery 10, printed circuit board 12 and piezo-electric element 14. As a result, the mounting of the tire module 7 is also simplified, which reduces production costs.

For example, the piezo-electric sensor 14 is simply piezo-electric material with corresponding electric contacts, wherein the piezo-electric material is attached, for example, to the battery 10 and to the printed circuit board 12.

According to another exemplary embodiment of the tire module 7 according to aspects of the invention, the piezo element 14 is a piezo buzzer which is known per se.

Figures 5A, 5B:
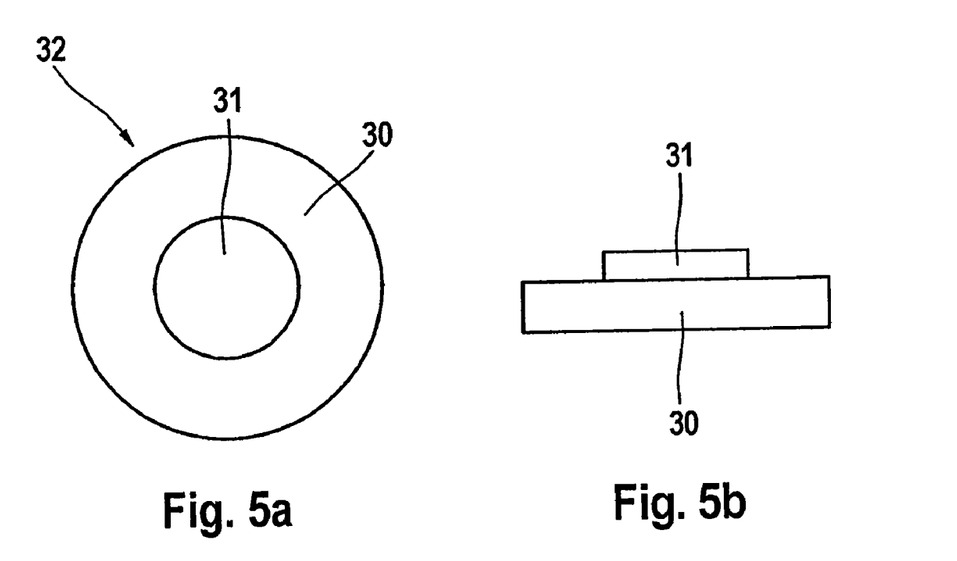
FIGS. 5a and 5b show an exemplary piezo-electric sensor.

FIGS. 5a and 5b is a schematic illustration of an exemplary piezo-electric element 32, FIG. 5a showing said piezo-electric element in a top view and FIG. 5a showing it in a side view. The exemplary element 32 is composed of a brass disc 30, to which piezo-electric material 31, in particular piezo ceramic, is attached.

The piezo-sensitive sensor can, for example, be attached under the battery 10 (for example FIGS. 2a and 2b), between the printed circuit board 12 and the battery 10 (for example FIG. 3, 5a or 5b) or directly to the printed circuit board 12 (without illustration). It may be permanently connected to the printed circuit board 12 or battery 10 (for example FIGS. 2a and 2b) or else be encapsulated without a direct connection to these components 12, 10 (for example FIGS. 5a and 5b) since the force effect is ensured by the sealing compound 15.

Figure 6:
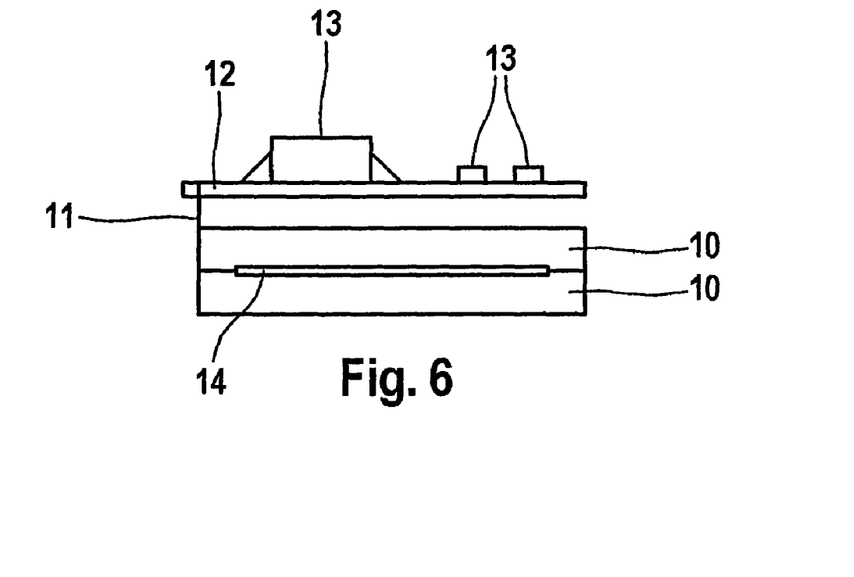
FIG. 6 shows an arrangement of components in a tire module according to aspects of the invention, in accordance with a fourth exemplary embodiment.

According to further exemplary embodiments of the tire module 7 according to aspects of the invention, the latter comprises two batteries 10. The two batteries 10 are arranged one on top of the other, and the piezo-sensitive sensor is arranged between the batteries 10 or above or below the batteries 10. The exemplary arrangement of a piezo element 14 between two batteries 10 is illustrated schematically in FIG. 6 (fourth exemplary embodiment). The other illustrated components correspond to the components illustrated in FIGS. 2a and 2b.

According to another exemplary embodiment, the piezo element 14 is conductively connected directly to a battery contact, therefore avoiding the need for contacting means.

The piezo element 14 arranged in the tire module 7 can be used either as a signal generator (for example for measuring shuffle) and as a micro generator (energy converter). By varying the size of the element 14 it is possible to scale the power or voltage which is output.

Figure 10:
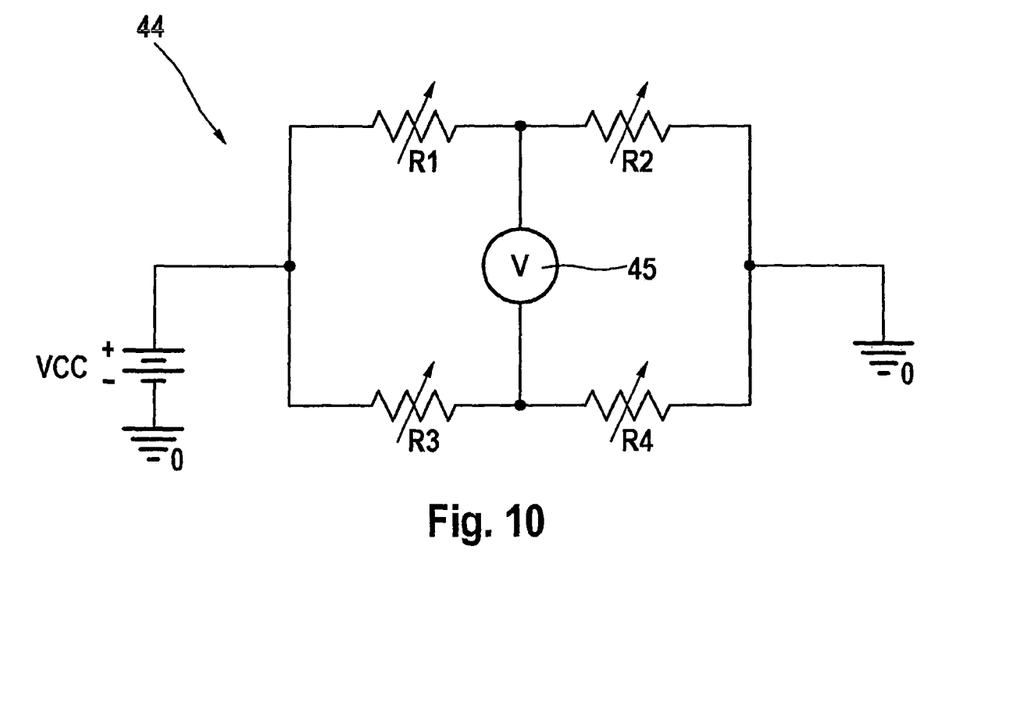
FIG. 10 shows an exemplary piezo-resistive sensor.

FIG. 10 is a schematic view of an exemplary piezo-resistive sensor of a further exemplary embodiment of a tire module 7 according to aspects of the invention. Instead of a piezo-electric element 14, at least one piezo-resistive measuring element (R1, R2, R3, R4) is used here. The piezo-resistive sensor 44 is essentially composed of a piezo-resistive measuring bridge, which is embodied, for example, as a Wheatstone bridge with four resistors R1, R2, R3 and R4. Here, for example all four resistors R1, R2, R3 and R4 are variable. However, it is also possible for fewer resistors to be variable (for example the resistance values of R1 and R2 are variable under deformation, while the resistance values of R3 and R4 remain the same under deformation). Furthermore, a sensor arrangement with more or fewer resistors (than the four resistors of a Wheatstone bridge) is also possible.

The piezo-resistive sensor 44 is supplied by a voltage VCC and provides an output voltage signal 45.

The surface of the piezo-resistive sensor 44 in the tire is, for example, arranged parallel to the tire contact face so that in each case at least two resistors change under deformation during tread shuffle 5, 6. The orientation of the sensor bridge relative to the tire rolling direction is insignificant here for the functional capability of the sensor.

An advantage of piezo-resistive measuring elements is that an extremely small and therefore cost-effective design with a MEMS structure is possible. In this context, the individual measuring resistors or the measuring bridge can be embodied directly using silicon. The MEMS can then be arranged as a "bare die" (without a housing) or can be housed and then soldered on. The piezo-resistive MEMS is advantageously integrated directly with other components (for example pressure sensor, microcontroller, RF stage etc.) in an integrated circuit (IC, ASIC).

Figure 11A:
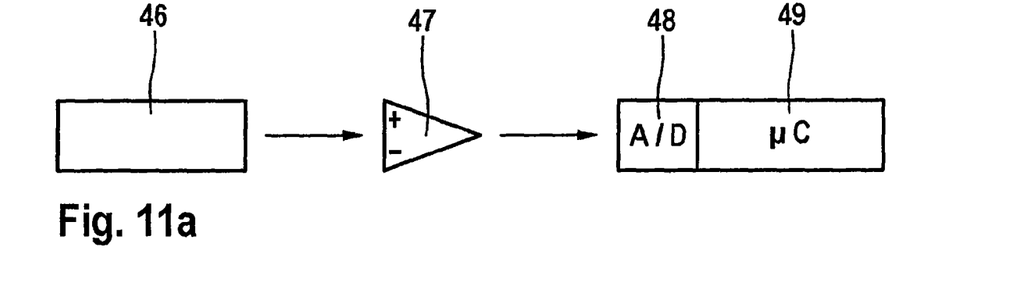
FIGS. 11a and 11b show two exemplary basic circuit diagrams of the evaluation of an output voltage of a piezo-resistive sensor.
Figure 11B:
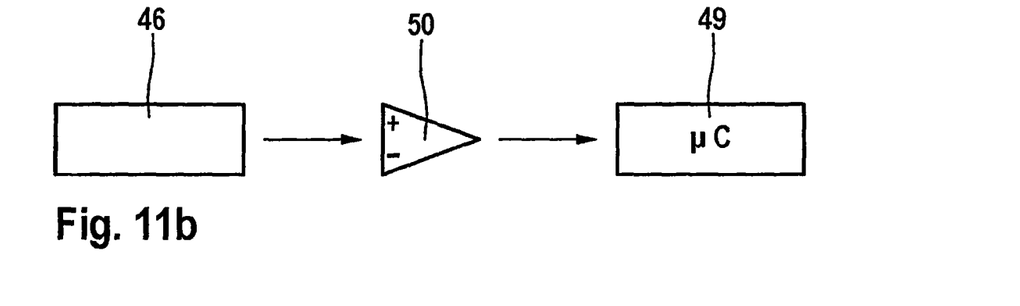

FIGS. 11a and 11b is a schematic illustration of two exemplary basic circuit diagrams of the evaluation of an output voltage of a piezo-resistive sensor 46.

According to the example illustrated in FIG. 11a the output signal of the sensor 46 is amplified by the amplifier 47 and fed to the A/D converter 48 of the tire module 7. After the A/D conversion 48, the signal is analyzed in the microcontroller 49. Depending on the configuration of the change in resistance, it is also possible for no amplification to be necessary.

According to the example illustrated in FIG. 11b, the output signal from the sensor 46 is evaluated by means of the comparator 50 and microcontroller 49. For example, during the tread shuffle the comparator provides an output voltage (corresponding to a logic "1") and outside the shuffle it does not provide an output voltage (corresponding to a logic "0"). It is therefore possible to easily define the time sequence between the tread shuffle and rotation without using an A/D converter.

The microcontroller 49 can also be replaced by a computing unit ("state machine").

The signals of the piezo-sensitive sensor are preferably evaluated in order to determine the shuffle length L.

In the text which follows, a further method for evaluating the output voltage signal 40 of a piezo-sensitive sensor will be described, by way of example using a piezo electric sensor 14. An analogous evaluation is possible for the output voltage signal 40 of a piezo-resistive sensor.

Figure 7:
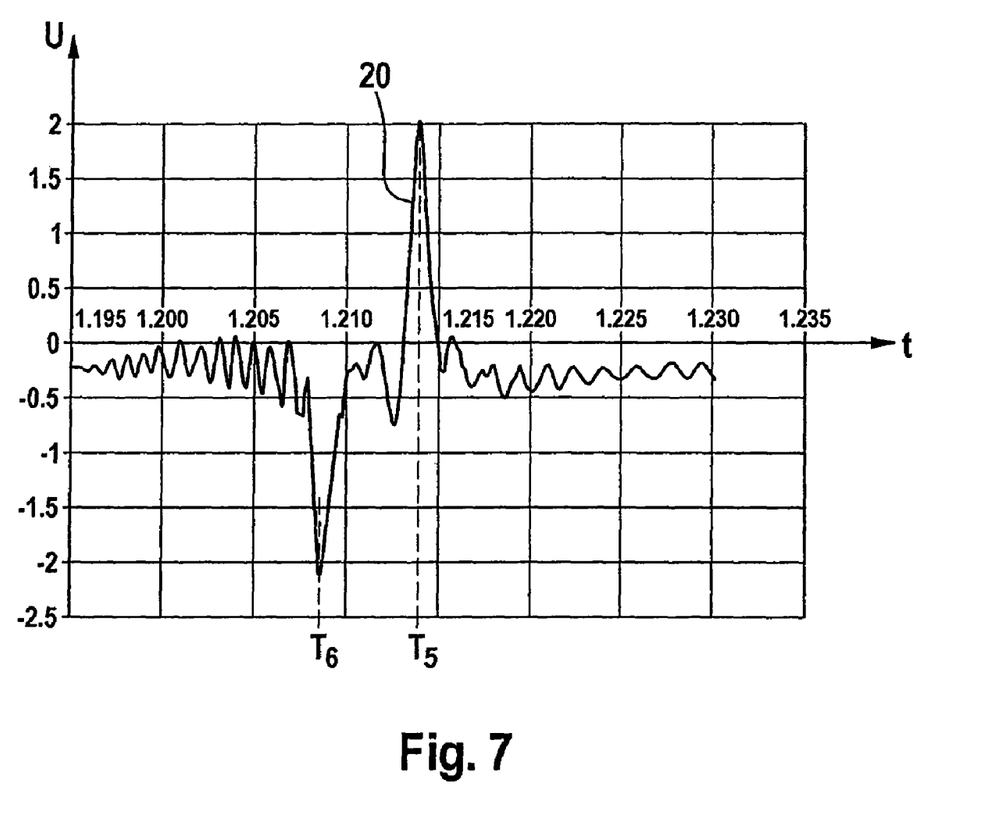
FIG. 7 shows an exemplary profile of an output voltage of a piezo-electric sensor in a tire.

An output signal 20, resulting from the deformation of a tire, of a piezo element 14 has, for example, the profile illustrated schematically in FIG. 7. The time t is plotted on the x axis, and the piezo voltage U or a variable corresponding thereto is plotted on the y axis. When the shuffle is entered $T_6$ and the shuffle is exited $T_5$, voltage peaks appear in signal 20. In the example illustrated, a negative voltage peak (peak) occurs when the shuffle is entered $T_6$, and a positive voltage peak (peak) occurs when the shuffle is exited $T_5$.

According to a further exemplary embodiment, the tire module 7 comprises a circuit for the disruption-free evaluation of the signal 20. In this context, the negative part of the signal 20 is evaluated separately from the positive part of the signal 20 (referred to as selective rectification).

Figure 8:
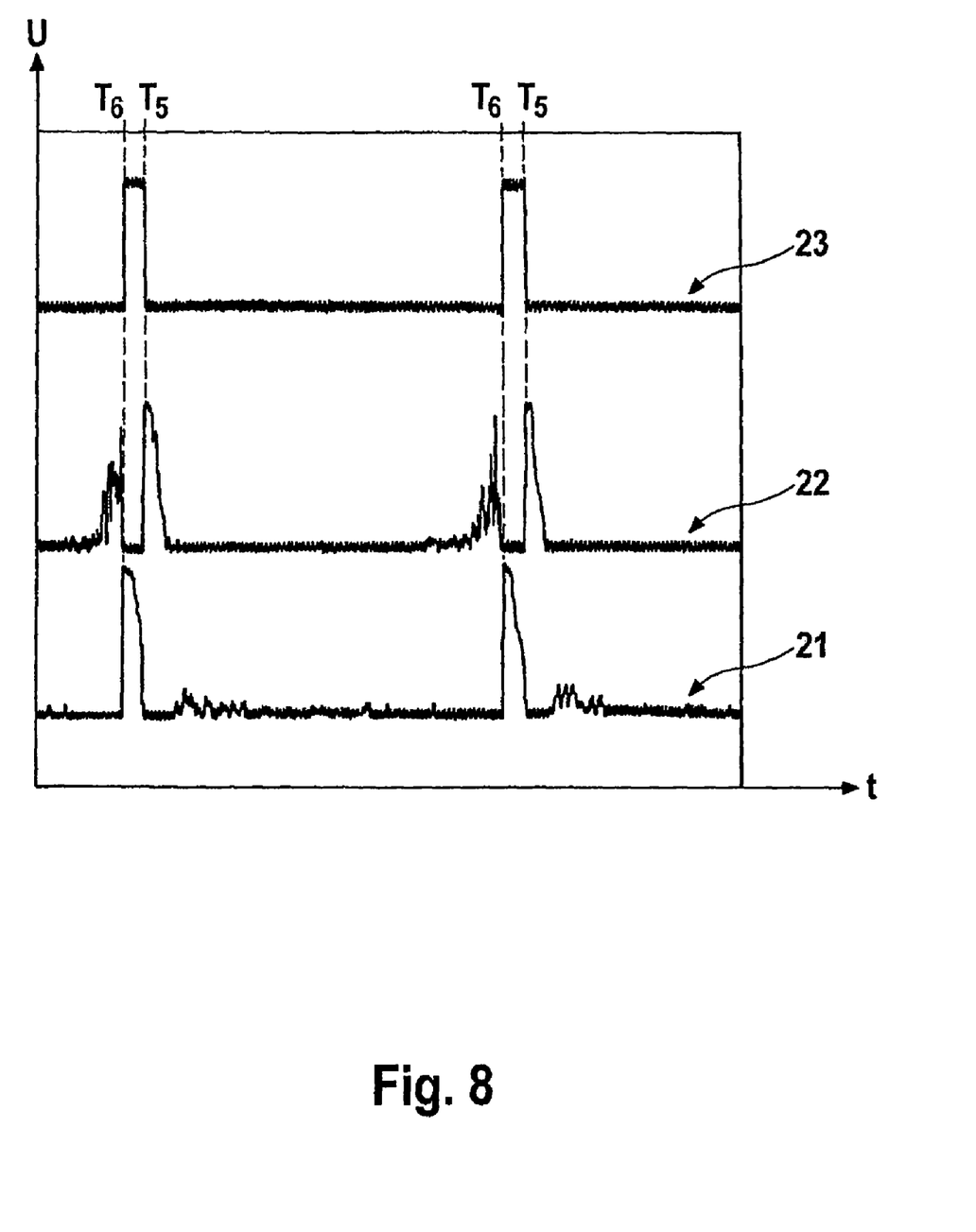
FIG. 8 shows exemplary evaluation signals of an output voltage of a piezo-electric sensor in a tire.

FIG. 8 shows, with the two lower signals 21, 22, exemplary profiles of the two selectively rectified signals. Curve 21 shows the contribution of the negative signal (the negative signal portion) and curve 22 shows the positive signal (the positive signal portion) for two tread shuffles. Curve 23 indicates the shuffle signal. When the shuffle is entered $T_6$, which is indicated by the steeply rising signal edge in the negative signal component 21, the shuffle signal 23 rises, and when the shuffle is exited $T_5$, which is indicated by the steeply rising signal edge in the positive signal component 22, the shuffle signal 23 drops away again. On the basis of the shuffle signal 23, the shuffle length L or the shuffle time or the ratio of the shuffle time to the wheel rotational time (time between two successive instances of entering of the shuffle $T_6$ or exiting of the shuffle $T_5$) can therefore be determined.

The selective rectification permits disruptive noise at the entering of a shuffle 6 or exiting of a shuffle 5 to be very effectively gated out. As clearly apparent from FIG. 8, given a separation of the positive signal 22 and negative signal 21 the shuffle 4 can easily be evaluated. This would be possible only with relatively large expenditure if the signal were completely rectified. A significant simplification or improvement of the measuring of the shuffle is therefore achieved.

In a method of evaluating signal 20 of a piezo element 14 which is known from the prior art, the signal 20 is sampled and digitized in order to be able to carry out precise evaluation of the signal profile. This is more complicated than the above-described method of the selective rectification of the piezo-element signal 20. Furthermore, the known evaluation consumes more current, in contrast to the evaluation method described here.

Figure 9:
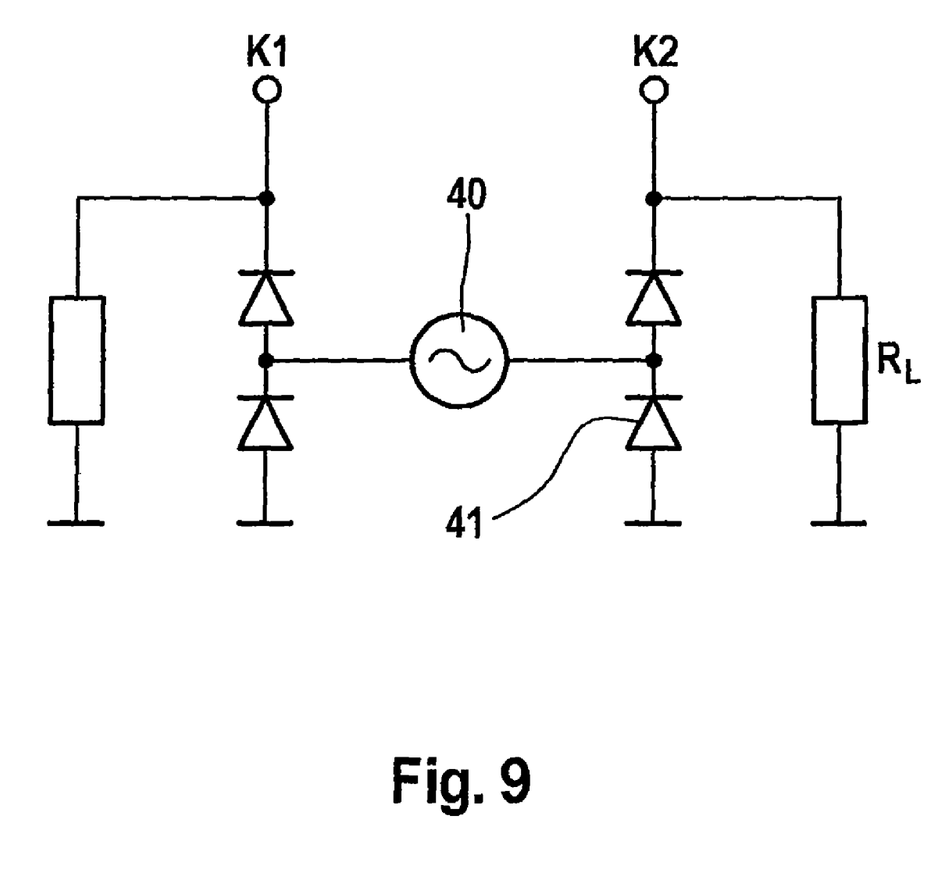
FIG. 9 shows an exemplary electronic circuit for evaluating an output voltage of a piezo-electric sensor.

FIG. 9 illustrates an exemplary electronic circuit for selective rectification. The voltage 40 of the piezo element 14 is rectified selectively by means of four diodes 41. The positive and negative signal components are tapped via the contacts K1 and K2.

The invention claimed is:

1. A tire module for detecting tire condition variables, which tire module is configured to be mounted on an inner side of a tire in an area which is deformed during tread shuffle, said tire module comprising at least one carrier means on which at least one electronic component is arranged, and at least one piezo-sensitive sensor, wherein the piezo-sensitive sensor is arranged in such a way that, when the tire is deformed during tread shuffle, said piezo-sensitive sensor is at least partially deformed, and wherein the deformation of the piezo-sensitive sensor is used to determine at least one shuffle characteristic variable, wherein the tire module further comprises at least one battery for at least partially supplying power to the at least one electronic component, the at least one battery being the only power supply source for the at least one electronic component of the tire module.

2. The tire module as claimed in claim 1, wherein the piezo-sensitive sensor is a piezo-resistive sensor that operates piezo-resistively and comprises at least one piezo-resistive element, wherein the piezo-resistive sensor comprises at least one voltage supply or is connected to a voltage supply, and wherein the shuffle characteristic variable is determined from an output signal of the piezo-resistive sensor.

3. The tire module as claimed in claim 2, wherein the piezo-resistive element comprises a piezo-resistive measuring bridge.

4. The tire module as claimed in claim 1, wherein an electronic evaluation circuit, in which a shuffle characteristic variable, which is a measure of a shuffle length (L) and/or a shape of the shuffle, is determined from an output signal of the piezo-sensitive sensor, and the electronic evaluation circuit is arranged in the tire module.

5. The tire module as claimed in claim 4, wherein the electronic evaluation circuit is arranged on the carrier means of the tire module.

6. The tire module as claimed in claim 1, wherein the carrier means and the battery are arranged one on top of the other with respect to a direction (z) of extent of the tire module,
wherein the carrier means and the battery are arranged perpendicularly with respect to the direction (z) of extent, in at least partially overlapping fashion,
wherein the piezo-sensitive sensor is arranged above or below or between the carrier means and the battery with respect to the direction (z) of extent, and
wherein the piezo-sensitive sensor is respectively arranged perpendicularly with respect to the carrier means and with respect to the battery and in an at least partially overlapping fashion with respect to the direction (z) of extent.

7. The tire module as claimed in claim 1, wherein the carrier means, the battery and the piezo-sensitive sensor are each of substantially planar design, and wherein base surfaces of the carrier means, battery and piezo-sensitive sensor are arranged substantially parallel and one on top of the other, wherein the base surfaces each at least partially overlap in pairs.

8. The tire module as claimed in claim 1, wherein the piezo-sensitive sensor is attached directly to the battery or to the carrier means.

9. The tire module as claimed in claim 1, wherein the piezo-sensitive sensor is bonded to the battery or to the carrier means.

10. The tire module as claimed in claim 1, wherein the carrier means, the battery and the piezo-sensitive sensor are at least partially embedded in a sealing compound.

11. The tire module as claimed in claim 10, wherein the carrier means, the battery and the piezo-sensitive sensor are completely embedded in a sealing compound.

12. The tire module as claimed in claim 10, wherein the piezo-sensitive sensor is arranged at a distance from the carrier means and from the battery, wherein the piezo-sensitive sensor is connected in a frictionally locking fashion to the carrier means and/or to the battery by the sealing compound.

13. The tire module as claimed in claim 12, wherein the piezo-sensitive sensor is arranged between the carrier means and the battery.

14. The tire module as claimed in claim 1, wherein the tire module comprises two or more batteries, which are arranged one on top of the other, wherein the piezo-sensitive sensor is arranged above or below or between the batteries.

15. The tire module as claimed in claim 1, wherein the piezo-sensitive sensor is a piezo-electric sensor that operates piezo-electrically and comprises at least one piezo-electric element, and wherein the shuffle characteristic variable is determined from an output signal of the piezo-electric sensor.

16. The tire module as claimed in claim 15, wherein the piezo-electric sensor comprises a carrier element made of metal and a piezo-electric material is applied to the carrier element.

17. The tire module as claimed in claim 16, wherein the carrier element is a brass disc or a brass plate.

18. The tire module as claimed in claim 16, wherein the piezo-electric material is a piezo-electric ceramic.

19. The tire module as claimed in claim 15, wherein the battery is connected in an electrically conductive fashion to the carrier layer via a battery contact, and the piezo-electric sensor is connected in an electrically conductive fashion to the battery contact.

20. The tire module as claimed in claim 15, wherein the tire module comprises an electronic circuit which is embodied in such a way that an electrical voltage, which is generated when the piezo-electric sensor is deformed, is also used to supply power to the tire module.

21. The tire module as claimed in claim 20, wherein the electronic circuit is provided on the carrier means of the tire module.

22. The use of a tire module as claimed in claim 1 in a tire pressure monitoring system.

* * * * *